UNITED STATES PATENT OFFICE 2,391,552

STABILIZED AROMATIC COMPOUNDS

David Curtis, New York, N. Y.

No Drawing. Application February 25, 1942,
Serial No. 432,322

5 Claims. (Cl. 167—52)

The present invention relates to methods and means for preserving aromatic compounds against oxidation and discoloration, and is a continuation in part of my application Serial No. 171,992, filed October 30, 1937, and which has issued as Patent No. 2,277,038 and my application Serial No. 417,712, filed November 3, 1941, and which has issued as Patent No. 2,385,564.

It is the object of the present invention to provide a new group of substances which may be added to solutions of aromatic compounds having a tendency to oxidize and discolor in solution, to stabilize such aromatic compounds and retard their oxidation and discoloration.

It is another object of the present invention to form a series of new aromatic compounds which contain anti-oxidant groupings in their molecular structure, which will reduce the tendency of the product to auto-oxidation and discoloration.

Aromatic compounds, particularly those of the groups of phenylic, hydroxy-phenylic, phenylamino, hydroxy-phenyl-amino, phenyl-alkyl and alkanol amino, and hydroxy-phenyl-alkyl and alkanol amino compounds, nearly all have a tendency to oxidize and discolor, to a greater or lesser degree, in solution or in the presence of moisture.

Sulphites, bisulphites, hydrosulphites, meta-bisulphites and other sulphurous compounds, which are used as anti-oxidants for oxidizable aromatic compounds, such as named above, tend to undergo oxidation themselves, to a lesser or greater degree, thus losing their anti-oxidative protective properties and, upon occasion, themselves turning into compounds of greater irritative properties than the original compound. An outstanding example is the case of sodium bisulphite, $NaHSO_3$, and meta-bisulphite, $Na_2S_2O_5$, which substances tend to undergo oxidation, losing their protective properties, when used to prevent oxidation and discoloration of epinephrine and epinephrine-like substances, and passing into the highly irritating, higher oxidation products of the sulphate, $SO_4$, ions.

I have found that by linking such sulphurous or sulphite compounds, to an aromatic aldehyde or a substituted aromatic aldehyde, the resultant addition products of greater stability and, consequently, of greater and more prolonged protective efficiency, are obtained.

I have found that the addition of such aromatic aldehyde bi-sulphites to an aqueous solution of an oxidizable aromatic compound of the character described, has the effect of greatly retarding the tendency of such aromatic compound to oxidize and discolor.

I have also found that by linking an aromatic aldehyde directly to the bi-sulphite of an oxidizable aromatic compound, an addition product of increased resistance to oxidation and discoloration is obtained.

I have also found that the addition of an oxidizable aromatic base, having an amino group or groups in the nucleus or in a side chain, to a solution of an aromatic aldehyde bisulphite, in suitable proportions, will result in the dissolving of the base to form a solution which is stable and resistant to oxidation and discoloration.

The aromatic aldehydes and their derivatives which could be used for the purposes of the present invention include the following: benzaldehyde and its hydroxy and substituted hydroxy derivatives, such as para-oxy-benzaldehyde, salicylaldehyde or ortho-oxy-benzaldehyde, resorcinolaldehyde, hydroxy - methoxy - benzaldehyde ($C_6H_3.OH.OCH_3.CHO$ 1,2,4-vanillic aldehyde), veratraldehyde (3,4 - dimethoxy - benzaldehyde, and other similar compounds capable of forming sulphite addition products, especially bisulphite addition products; also cinnamic aldehyde, anisaldehyde, amyl cinnamic aldehyde, phenyl acetaldehyde and others.

The sulphur compounds, with which the foregoing aromatic aldehydes are to be combined for the purposes of the present invention, are the oxidizable sulphur compounds, which include sulphurous acid ($SO_2,H_2O$), sulphites, and especially the bisulphites, hydrosulphites (to form aldehyde sulfoxylates, such as $C_6H_5.C(OH)H.SO_2H$-benzaldehyde sulfoxylate), and meta-bisulphites, the last three of which will hereinafter be referred to as bisulphites, generally.

The aromatic aldehydes and the bi-sulphites combine in substantially equimolecular proportions, to form the desired addition products. Excess of either the aldehyde or the bi-sulphite compound may in certain cases be indicated. Some of the bi-sulphite compounds are also capable of combining with more than one molar equivalent of the aromatic aldehyde. Thus, sodium hydrosulphite ($Na_2S_2O_4$), may also combine with two molar equivalents of benzaldehyde, vanillin and others.

The aromatic aldehyde bi-sulphite compounds may partially dissociate, in solution, to a lesser or greater extent, reversibly, into the original bisulphite and aromatic aldehyde, or may imperfectly combine; but the reducing power of such a solution remains active for prolonged periods of time, thus accounting for the prolonged efficacy of such solutions as anti-oxidants.

Some specific examples of the aromatic aldehyde bisulphite addition products of the present invention are: benzaldehyde in combination with sodium bisulphite, potassium bisulphite, lithium bisulphite, magnesium bisulphite, calcium bisulphite, respectively, and the like. Also benzaldehyde-potassium meta bisulphite $(K_2S_2O_5)$ benzaldehyde-sodium hydrosulphite $(Na_2S_2O_4)$, vanillic aldehyde-sodium bisulphite, benzaldehyde-hydrogen sulphite $(C_6H_5CH(OH)SO_3.H)$. Any of the other aromatic aldehydes may be substituted for benzaldehyde and any alkali metals and alkaline earth metals may be substituted for sodium in the above combinations.

The anti-oxidants of the present invention may be used, in actual practice, in proportions varying from amounts less than the amount of substance to be preserved, to amounts greater than the amount of substance to be preserved, depending upon conditions of storage, type of container, conditions of use, and on whether a stock compounding, either in solid or solution form is made, which is to be subsequently adjusted or diluted to a desired concentration for use, or a final solution, ready for use, is made. The amount of anti-oxidant to be used will also depend on the nature and quantity of any other substances present in the solution with the substance to be preserved.

The anti-oxidant effectiveness of the various addition compounds of the present invention vary, to some extent, within limits of great utility, and they may be used singly or in combination in the same solution.

Generally stated, the anti-oxidants of the present invention not only promote greater resistance to oxidation and discoloration than the bisulphites or similar substances heretofore commonly used; but, in addition, accomplish such results, particularly in connection with such compounds as epinephrine or like substances, with the presence of a relatively lesser amount of bisulphites than is generally used for the purpose. Thus, the standard 0.1% solution of epinephrine, as obtains in the market, is now preserved with from 0.1% to 0.2% of sodium bisulphite. Objections have been expressed to such a high quantity of bisulphite because of resulting high irritability. (See: Proc. Soc. EXPT. Biol. Med., v. 36, pp. 584–7, 1937. Also M. L. Tainter, J. Am. Dental Assn., 1939, p. 137.)

I have found that I may effectively preserve such a 0.1% solution of epinephrine, through the addition of from 0.05% to 0.1% of any of the following: benzaldehyde-sodium bisulphite, paraoxy-benzaldehyde-sodium bisulphite, benzaldehyde-potassium-meta-bisulphite, benzaldehyde-sodium-hydrosulphite, cinnamic aldehyde-sodium bisulphite, vanillin-sodium bisulphite, and others. The amount of sodium bisulphite present in each of the aromatic aldehyde-bi-sulphites thus used is, of course, less than the total amount of the anti-oxidant compound used. For instance, in the benzaldehyde-sodium bisulphite it is just about half, being from about 0.025% to about 0.05%, which is in accordance with the expressed desire, more or less, of the foregoing citations.

Commercially, it may be desirable to add to an epinephrine solution some sodium thiosulphate, in addition to the aromatic aldehyde bisulphite compound. Thus to a 1.0% solution of epinephrine or any of its substitutes, in a medium of 0.5% chlorbutenol, also containing 0.7% NaCl, 0.2% of sodium thiosulphate and from 0.1% to 0.2% of benzaldehyde sodium bisulphite may be added. Such a solution is effectively preserved.

Many of the aromatic aldehyde bisulphite compounds have an acid reaction to methyl red. Others range from about neutral to methyl red to alkalinity. The last includes cinnamic aldehyde bisulphite.

It is known, of course, that the stability of many of the oxidizable aromatic compounds, such as epinephrine and epinephrine like compounds and others, is greater in acid solution. Therefore, if it is desired, an alkaline reacting aromatic aldehyde bisulphite may be adjusted to the acid side. This may be accomplished through the addition of $SO_2$ water or by mixing with an aromatic aldehyde bisulphite of lower pH value, until the desired pH on the acid side is obtained. It is to be noted, however, that a certain amount of protection against oxidation is also afforded by the alkaline reacting aromatic aldehyde bisulphite compounds. It is also to be noted that the easily oxidizable substances, such as epinephrine base, may be easily dissolved in an acid reacting aromatic aldehyde bisulphite compound solution, and will produce an alkaline solution of epinephrine of relative stability and freedom from discoloration, without the need for further modification. Thus, when 0.1 gm. of epinephrine base is dissolved in a solution containing 0.2 gm. of benzaldehyde-sodium bisulphite, which is acid to methyl red, and the solution made up to 100 cc. with distilled water, a solution is obtained having a pH from 6.4 to 6.5, brom-thymol blue, which remains substantially colorless.

I have also found that the acid solution of an adrenalin salt, preserved with an acid reacting aromatic aldehyde bisulphite compound, when treated with a mild alkaline substance, such as sodium bicarbonate, to adjust its pH from the acid side of methyl red to about 6.4 to 6.5, brom-thymol blue, will remain colorless for a period of about 24 hours, even when completely exposed at room temperature, in more or less small volume; thus affording a chance to utilize an alkaline epinephrine solution at least for a clinical day.

To obtain even greater stability of alkaline solutions of oxidizable phenolic compounds, the following may be done: To a solution of an acid reacting aromatic aldehyde bisulphite compound, a neutral or normal sulphite salt, such as sodium sulphite is added, preferably in an amount in excess over the molecular of the acid sulphite present in the particular addition product used. The reaction of the solution then becomes alkaline to litmus paper. Mild alkaline substance, such as alkaline sodium or potassium citrate and sodium bicarbonate and borax are then added to the solution. The anti-oxidant mixture thus prepared is then added, in substantially standard proportions to the oxidizable phenolic compound. The final mixture, if not already alkaline, may be further treated with a mild alkaline substance, until the desired degree of alkalinity is obtained. Such final solution will remain colorless for considerable periods of time.

Thus, for instance, 2.5 gms. of sodium sulphite are added to a solution of 3 gms. of benzaldehyde-sodium bisulphite in 200 cc. of water. This is followed by the addition and dissolving of 2.5 gms. of sodium citrate and 1 gm. of sodium bicarbonate. 2 cc. of the resulting solution may be added to preserve 100 cc. of a 0.1% solution of epinephrine made alkaline with sodium bicarbonate. The amount of anti-oxidant thus added, in terms of active aldehyde-bisulphite-sulphite combination present, amounts to about 0.05%.

The above anti-oxidant preparation is particularly suitable for the preservation of oxidizable hydroxy-phenolic compounds, such as hydroquinone and others. Thus, when about 7.5 cc. of the above anti-oxidant solution (containing about 0.2 gm. of the active bisulphite-sulphite) are added to 2 gms. of hydroquinone in 100 cc. of water and the solution made alkaline with sodium bicarbonate, the hydroquinone solution thus treated will remain colorless longer than a similar solution of hydroquinone, made alkaline with sodium bicarbonate, to which 0.2 gm. of sodium sulphite alone has been added.

It is to be noted, particularly, that when the above anti-oxidant preparation is added to a solution containing, as the active ingredients, a combination of hydroquinone and para-methyl-amino-phenol sulphate, and also containing the usual amount of sodium sulphite and sodium carbonate, a solution capable of reducing silver and remaining colorless for a long period of time is produced.

Solutions of epinephrine and like substances, in the presence of anaesthetics, such as in a standard procaine solution, have, heretofore, been stabilized by the use of sodium hydrogen sulphite, which is, of course, subject to more or less rapid auto-oxidation. I have, heretofore, also used, with better results, sodium thiosulphate together with sodium bisulphite or sodium sulphite, preferably the former; the latter group of substances being added to overcome the tendency of sodium thiosulphate to become decomposed because of its great sensitivity to acidic substances, certain of which are found or may develop in such anaesthetic-epinephrine solutions. Such mixture of anti-oxidants, as I have previously developed it, is a vast improvement over the use of sodium thiosulphate alone, as indicated in the Bull. Sc. Pharm., v. 31, pp. 88–94, 1924.

I have found, however, that through the substitution of aromatic aldehyde bisulphite for the sodium bisulphite, in my above sodium thiosulphate-sodium bisulphite mixture, a still greater improvement is obtained, due to the greater stability of such aromatic aldehyde-bisulphite as compared with the ordinary bisulphite.

The anti-oxidant mixture of sodium or similar thiosulphate and aromatic aldehyde-bisulphite may be used to stabilize epinephrine and epinephrine-like substances in numerous anaesthetic salt solutions, such as in solutions containing the hydrochloride, or the tartrate, the citrate, the gluconate, the malate, the cinnamate, the sulphite, the sulphate, the hydrogen sulphite, the thiosulphate and other organic and inorganic acid salts of procaine and other anaesthetic bases.

Of the epinephrine-like and other vaso-constrictor substances which may be stabilized in anaesthetic solutions by my above combination of anti-oxidants, the following are some that may be named: 3,4 dihydroxy-phenyl-propanolamine, 3,4 dihydroxy-phenyl-ethyl-methylamine, in the form of their salts, as hydrochlorides, bitartrates, citrates, gluconates, cinnamates, and the like.

As an example of an anaesthetic-epinephrine solution, preserved in accordance with the foregoing description, the following may be given:

Procaine hydrochloride _____ 2%
Chlorbutanol _____ 0.5%
Sodium chloride _____ 0.66% or less
Potassium sulphate _____ 0.33%
Epinephrine salt, figured to base
    content __ 1:60,000 to 1:30,000
Sodium thiosulphate
    (anhydrous) __ 0.1% to 0.15%
Benzaldehyde sodium bisulphite __ 0.05% to 0.1%
In distilled water.

Instead of procaine hydrochloride, any other of the above enumerated anaesthetic salts may be used, figured to 2% of salt or base content, or other requisite concentration. Instead of epinephrine, any of its substitutes may be used.

In addition to the aromatic aldehyde-sodium bisulphite, ordinary sodium bisulphite or sodium sulphite may be added to the sodium thiosulphate, as conditions may require, such as the degree of acidity, for instance, of the solution.

I have also found that it is possible to combine epinephrine base and like oxidizable amino-phenolic compounds directly to an aromatic aldehyde bisulphite, of the acid reacting type, in solution. Thus, by way of example, 0.1 gm. of the generally insoluble epinephrine base may be readily dissolved in 100 cc. of a 0.2% aqueous solution of benzaldehyde-sodium bisulphite. The pH of the resultant solution is 6.4 to 6.5, brom thymol blue.

Similarly, oxidation resistant compounds of the amino-phenylic substances may be prepared by first forming a bisulphite of the amino-phenylic base, which then becomes analogous to sodium bisulphite (NaHSO₃), the amino-phenylic bisulphite having the probable general formula of R.H₂SO₃, R standing for the amino-phenylic radicle. This amino-phenylic bisulphite may then be combined with an aromatic aldehyde, in the manner that sodium bisulphite combines with the same aromatic aldehyde. The general formula of the final compound probably is:

R standing for the aromatic nucleus of the aldehyde and R' for the amino-phenylic base, similar to the aromatic aldehyde-sodium bisulphite compound, which has the formula of

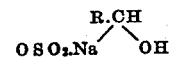

As specific examples of the method for making the aromatic aldehyde-amino-phenylic-bisulphite compounds, the following may be given:

0.183 gm. of epinephrine base is suspended in 25 cc. of 0.5% chloretone water. Sufficient SO₂ water is then added, drop by drop, while stirring, until a clear solution is obtained. Generally a little more than the molecular equivalent of SO₂ may be added (or slightly more than 0.064 gm. of SO₂, in this example). After the solution is clear, an equimolecular amount of benzaldehyde, 0.1061 gm. is added and the mixture agitated until it clears. When diluted with chloroetone water to form a 0.1% solution, with respect to base, the pH registers about 6.3, brom-thymol blue.

When the above synthesis is conducted in a sufficiently small volume of water, a precipitate of the newly formed compound is produced, which may be separated. The compound has the probable formula of C₆H₅CH(OH)SO₃.HR, R standing for the epinephrine base radicle. The compound is relatively stable in solution, but may be additionally preserved by the further addition of an aromatic aldehyde-bisulphite.

Similarly benzaldehyde-ephedrine bisulphite may be prepared. This compound is readily soluble in water.

Likewise, aromatic aldehyde-anaesthetic-bisulphites of the alkyl and alkyl-amino-para-aminobenzoate type and similar types may be prepared. For example:

2.36 gms. of procaine base are suspended in a beaker containing 0.64 gm. of $SO_2$ in water. The mixture is stirred until the procaine goes into solution, forming procaine bisulphite, which is acid to litmus. 1.061 gms. of benzaldehyde are then stirred in, while agitating the solution, until it clears, with the formation of benzaldehyde procaine bisulphite. This solution is alkaline to litmus.

Benzaldehyde-benzocain bisulphite may be prepared by dissolving benzocain base in a small amount of alcohol and adding the solution to $SO_2$ water containing slightly more than the molar equivalent of $SO_2$. The mixture is agitated until a white precipitate of benzocain bisulphite is formed. The molar equivalent of benzaldehyde is now stirred in. A yellow reddish mass first forms, which upon continued stirring, passes into a snowy-white crystalline material.

Using orthoform (methyl para oxy-metaminobenzoate) instead of benzocaine, benzaldehyde-orthoform bisulphite is obtained, a product soluble in water and being acid to methyl red.

The foregoing aromatic aldehyde-phenylic-amino bisulphites may also be formed from the amino-phenylic salts, by first neutralizing the acid radicle to which the phenylic base is attached by the addition of sodium bicarbonate or other suitable alkaline substance and then proceeding as previously indicated in connection with the method of formation from the base.

As a specific example: To 0.333 gm. of epinephrine bitartrate (containing 0.183 gm. of epinephrine base), dissolved in 10 cc. of water 0.084 gm. of sodium bicarbonate is added. The mixture is stirred and to it is quickly added 2.2 cc. of a 3% solution of $SO_2$ (containing slightly more than the molar equivalent of 0.064 gm. of $SO_2$) and 0.1061 gm. of benzaldehyde is then stirred in, until solution is complete.

It is also possible to link a phenyl-amino compound of the character described to a previously formed aromatic aldehyde compound of sulphurous acid.

Para methyl-amino phenol sulphate itself, which is acid in solution, may be effectively preserved by benzaldehyde-sodium bisulphite alone. Thus, a 2% aqueous solution of the para methylamino phenyl sulphate may be preserved and its discoloration prevented for a long period of time by the addition of 0.1% of benzaldehyde-sodium bisulphite.

This completes the description of the preserving methods of the present invention and of the resulting products. It will be readily understood that within the principles herein discussed, many modifications and variations, as to the methods employed, the products preserved and the products used and formed for preserving, may be made without the use of the inventive faculties and within the spirit and scope of the present invention and of the claims hereto appended.

What I claim as my invention is:

1. As a new composition of matter, a preparation containing an epinephrine salt and an addition product of an aromatic aldehyde with a salt selected from the group consisting of bisulphite salts, hydrosulphite salts and metabisulphite salts.

2. As a new composition of matter, a preparation containing an anaesthetic salt, an oxidizable vaso-constrictor, and, as an anti-oxidant, an addition product of an aromatic aldehyde with a salt selected from the group consisting of bisulphite salts, hydrosulphite salts and metabisulphite salts.

3. A composition of matter comprising an oxidizable phenyl compound from the group consisting of aromatic compounds having a hydroxyl grouping in the aromatic nucleus; hydroxylated amino-aromatic compounds and hydroxylated, alkyl-substituted amino-aromatic compounds having a hydroxyl grouping attached to the aromatic nucleus and having the amino grouping in an alcohol chain which is attached to the aromatic nucleus; alkyl and alkamine carboxylic acid esters of p-amino-benzoic compounds; and hydroxylated amino-aromatic compounds and hydroxylated, alkyl-substituted amino aromatic compounds having a hydroxyl grouping and the amino grouping attached to the aromatic nucleus, and, as an anti-oxidant, an addition product of an aromatic aldehyde with a salt selected from the group consisting of bisulphite salts, hydrosulphite salts and metabisulphite salts.

4. A composition of matter containing an oxidizable phenyl compound from the group consisting of aromatic compounds having a hydroxyl grouping in the aromatic nucleus; alkyl and alkamine carboxylic acid esters of p-amino-benzoic compounds; hydroxylated amino-aromatic compounds and hydroxylated, alkyl-substituted amino-aromatic compounds having a hydroxyl grouping attached to the aromatic nucleus and having the amino grouping in an alcohol chain which is attached to the aromatic nucleus; and hydroxylated amino aromatic compounds and hydroxylated, alkyl-substituted amino-aromatic compounds having the hydroxyl grouping and the amino grouping attached to the aromatic nucleus, and, as an anti-oxidant, an addition product of an aromatic aldehyde and a metallic bisulphite salt.

5. A composition of matter containing an oxidizable phenyl compound from the group consisting of aromatic compounds having a hydroxyl grouping in the aromatic nucleus; alkyl and alkamine esters of p-amino benzoic acid; hydroxylated amino aromatic compounds and hydroxylated, alkyl-substituted amino-aromatic compounds having a hydroxyl grouping in the aromatic nucleus and the amino grouping in an alcohol chain attached to the aromatic nucleus; and hydroxylated amino-aromatic compounds and hydroxylated, alkyl-substituted amino-aromatic compounds having a hydroxyl grouping and the amino grouping attached to the aromatic nucleus, and, as an anti-oxidant, an addition product of an aromatic aldehyde and a salt selected from the group consisting of bisulphite salts, hydrosulphite salts and metabisulphite salts and a normal sulphite salt.

DAVID CURTIS.